United States Patent [19]
Rott

[11] Patent Number: 4,962,791
[45] Date of Patent: Oct. 16, 1990

[54] SEAT VALVE

[75] Inventor: Horst Rott, Mühlbach, Fed. Rep. of Germany

[73] Assignee: Mannesmann Rexroth GmbH, Postfache, Fed. Rep. of Germany

[21] Appl. No.: 436,929

[22] Filed: Nov. 13, 1989

Related U.S. Application Data

[63] Continuation of Ser. No. 254,879, Oct. 4, 1988, abandoned.

[51] Int. Cl.⁵ .............................. F15B 13/042
[52] U.S. Cl. ..................... 137/625.66; 137/625.26; 137/625.27; 137/625.49; 137/901
[58] Field of Search ............. 137/112, 625.26, 625.27, 137/625.49, 625.5, 625.66, 901, 469; 251/210.

[56]        References Cited
          U.S. PATENT DOCUMENTS

| | | | |
|---|---|---|---|
| 2,778,316 | 1/1957 | Haight et al. ............ | 137/112 X |
| 2,793,656 | 5/1957 | Frain et al. ............. | 137/469 |
| 3,267,950 | 8/1966 | Langdon ................. | 137/112 |
| 3,454,029 | 7/1969 | Fredo .................... | 137/112 |
| 4,253,481 | 3/1981 | Sarlls ................... | 137/112 |
| 4,620,565 | 11/1986 | Brown ................... | 251/129.14 X |

FOREIGN PATENT DOCUMENTS

| | | |
|---|---|---|
| 1252027 | 4/1968 | Fed. Rep. of Germany . |
| 2040257 | 4/1972 | Fed. Rep. of Germany ............ 137/625.66 |
| 2520889 | 12/1975 | Fed. Rep. of Germany . |
| 2625555 | 12/1977 | Fed. Rep. of Germany ............ 137/625.66 |
| 3006530 | 9/1980 | Fed. Rep. of Germany . |
| 2922419 | 12/1980 | Fed. Rep. of Germany . |
| 3128279A1 | 2/1983 | Fed. Rep. of Germany . |
| 3209202A1 | 9/1983 | Fed. Rep. of Germany . |
| 3310785 | 10/1984 | Fed. Rep. of Germany . |
| 3610693A1 | 10/1987 | Fed. Rep. of Germany . |

Primary Examiner—Gerald A. Michalsky
Attorney, Agent, or Firm—Harness, Dickey & Pierce

[57]            ABSTRACT

The invention relates to a seat valve in which a ball-shaped valve element is held in a sleeve which has control edges which cooperate with an opening arranged between the valve seats and connected to a connection. On switching over of the valve element from one valve seat to the other a positive switching overlap of the seat valve is achieved and with relatively small ball diameters large flow rates can be controlled.

9 Claims, 3 Drawing Sheets

SEAT VALVE

This is a continuation of U.S. patent application Ser. No. 254,879, filed Oct. 4, 1988, now abandoned.

BACKGROUND OF THE INVENTION

The invention relates to a seat valve.

Seat valves with a spherical valve element are known. With such valves a leakage-free sealing can be effected but a positive switching overlap cannot be implemented without additional steps. In three-way seat valves in which a working connection is selectively connectable to a fluid connection and a tank in certain cases a positive switching overlap is desired. Thus, for example whilst the valve element is being switched over the passage from the fluid connection to the working connection is not to be freed until the passage between the working connection and the tank has been shut off.

According to an earlier application (P 36 10 693) the valve ball is guided in a bore of a valve insert, a sealing action resulting between the equator of the ball and the bore. This is employed for positive switching overlap in that the connection between the working connection opening centrally into the bore and the fluid connection or the tank is not released or shut off respectively until the ball has moved beyond the working connection. For leakage-free sealing the ball then bears sealingly on the valve seat.

It is further known (DE-PS 3,310,785) to hold the spherical valve element of a seat valve in a sleeve of which the end face as onflow face faces the valve seat and which is guided in an axial bore of the housing or of a housing insert. This reliably ensures opening of the valve and the full passage cross-section is opened.

The problem underlying the invention is to provide a seat valve with positive switching overlap.

SUMMARY OF THE INVENTION

In accordance with the invention, a ball valve element is supported within a sleeve displaceable in the bore provides good guiding of the valve element. On the one hand, the one end face of the sleeve acts as control edge cooperating with the connection opening into the bore to obtain a positive switching overlap on switching over the valve element. On the other hand, the valve element held in the sleeve cooperates with the valve seat and provides a leakage-free sealing in the respective end position.

The additional advantage is achieved that the end face of the sleeve is used as onflow face and the opening movement is thus assisted by the pressure force acting on the end face to open the through cross-section completely immediately.

BRIEF DESCRIPTION OF THE DRAWINGS

Examples of embodiment of the invention will be explained in detail hereinafter with the aid of the drawings, wherein.

DETAILED DESCRIPTION OF THE PREFERRED EMBODIMENTS OF THE INVENTION

Figure 1:
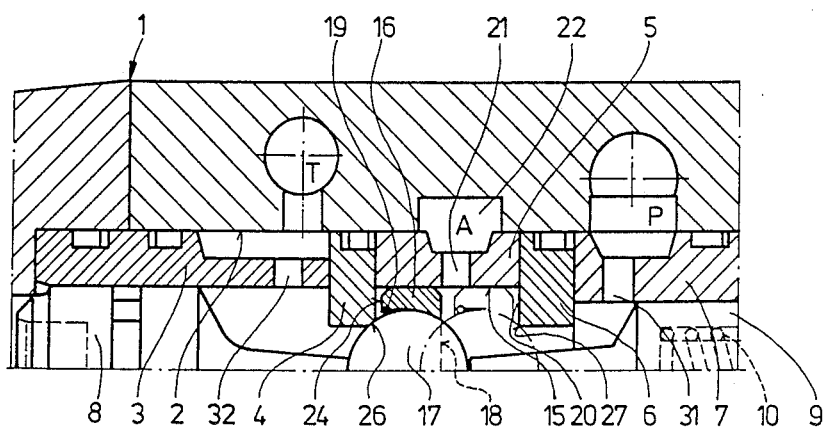
FIG. 1 is a section through a 3/2-way valve in a first embodiment.

In FIG. 1 in a bore 2 of a valve housing 1 a cylinder 3, a ring 4, a guide cylinder 5, a further ring 6 and a further cylinder 7 are arranged. The cylinders 3 and 7 serve to guide pistons 8 and 9, of which the piston 9 is subjected to the action of a spring 10. The piston 8 is actuated in a manner not illustrated.

Displaceably guided in the bore 15 of the guide cylinder 5 is a sleeve 16 in which a valve element 17 in the form of a ball is held. In the embodiment illustrated the sleeve 16 comprises an end face 18 of which the inner periphery defines a stop shoulder for the ball 17 which in turn is held on said shoulder by an inserted ring such as a spring ring 19.

An opening 21 opens centrally into the chamber 20 formed by the ball 15 in the guide cylinder 5 and the two rings 4 and 6, said opening 21 being connected via a recess 22 in the housing 1 to a working connection A in a manner not illustrated.

The end face 18 of the sleeve 16 and the opposite end face 24 of the sleeve cooperate with the opening 21 as control edges.

The sides of the rings 4 and 6 facing the valve element form valve seats 26 and 27 respectively for the valve element 17. A passage is established respectively from the chamber 20 to an opening 31 in the cylinder 7 connected to a fluid source P and to an opening 32 in the cylinder 3 connected to a tank T.

In FIG. 1 the valve element 17 bears on the valve seat 26, the passage between the working connection A and the tank T thus being shut off, whilst the passage from the fluid connection P to the opening 21 and to the working connection A is open. If this passage is to be closed the piston 8 is actuated and the valve element moved to the right, the end face 18 firstly moving as control edge over the opening 21 and shutting off the latter. The passage from the fluid source to the working connection is thus shut off. This positive switching overlap continues until the valve element 17 has switched to the position shown in dot-dash line in which it bears on the valve seat 27. The end face 24 of the sleeve 17 acting as control edge has released the opening 21, the connection between the working connection A and the tank T thereby being established.

Switching back is by the force of the spring 10 and with the aid of the pressure of the fluid acting on the valve element 17 within the valve seat 27 when the piston 8 is released. As soon as the valve element 17 has lifted off the valve seat 27 the end face 18 acts as onflow face for the fluid. As a result the valve element is immediately lifted completely off the valve seat 27 and the flow path fully opened.

Figure 2:
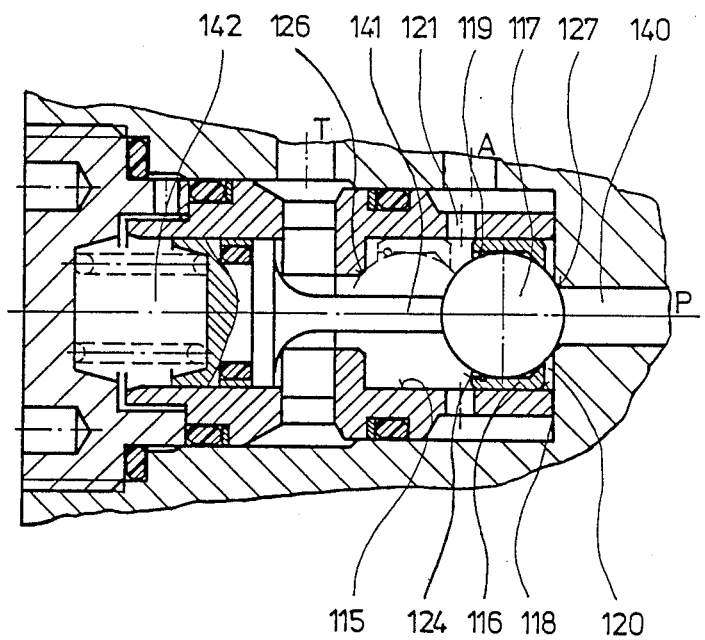
FIG. 2 is a section through a 3/2-way valve in a modified embodiment.

FIG. 2 also illustrates a 3/2-way valve in which the ball-shaped valve element 117 is likewise held in a sleeve 116. Identical constructional features are also otherwise provided with the same reference numerals with a prefixed one. The difference from FIG. 1 resides substantially in that the connection of the fluid source belonging to the valve seat takes place directly in the space 140, i.e. for actuating the valve element 117 no piston is provided, the actuation being effected in contrast by the pressure P.

In the position on the valve seat 127 shutting off the working connection A to the fluid source P the valve element 117 is held by a piston 141 whose end remote from the valve element 117 is acted upon hydraulically in a spring space 142. If the spring space 142 is relieved of pressure the valve element 117 is opened by the pressure in the space 140 and displaced until it bears on the valve seat 126, giving a positive switching overlap in the manner already described.

In the manner readily apparent from FIG. 2 the leakage is minimal between the bore 115 and the outer diameter of the sleeve 116 and between the valve element 117 and the retaining ring 119 as well as between the valve element 117 and the engagement shoulder on the inner side of the sleeve. On the other hand, between the sleeve 116 and the valve element 117 a clearance results which is large enough for the valve element to bear fully on the respective valve seat and thus ensure leakage-free sealing.

In the embodiments the valve element is constructed as ball. Since however the valve element is held in the sleeve a different configuration may be provided as long as the valve element has faces which cooperate with the valve seat and permit insertion and holding in the sleeve.

Furthermore, the combination of valve element and sleeve has the advantage that the valve can be designed in simple manner for relatively large flow rates without the ball having to have excessive diameters.

Figure 3:
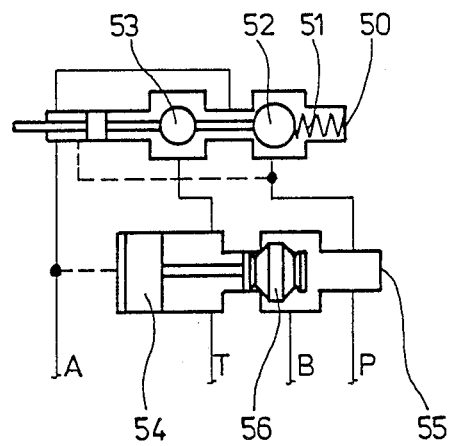
FIG. 3 is a schematic illustration of the valve arrangement for actuating the seat valve according to FIG. 2.

FIG. 3 shows the seat valve illustrated in FIG. 2 in conjunction with a 3/2-way seat valve. For example, a double-action cylinder can be actuated via the working connections A and B. The valve arrangement illustrated in FIG. 3 is used as 4/2-way seat valve.

In the initial position the main valve 50 is not actuated. A spring 51 holds the ball 52 in a position in which the pressure connection P is shut off from the working connection A. The working connection A is connected via the opened ball 53 to the tank T. The control piston 54 of the 3/2-way valve 55 is relieved of pressure. The pressure acting via P displaces the valve element 56 onto the seat so that P is connected to B and B is shut off from T.

On actuation of the main valve 50 the ball 53 is displaced against the spring 51 and pressed onto the seat. The working connection A is now shut off from the tank T.

After switching over the main valve 50 the pressure connection P is connected to the working connection A. Since the pump pressure acts via A on the large face of the control piston 54 of the valve 55 the valve element 56 is switched over by the piston 54 and B thereby connected to T and B shut off from P. The switching element 56 has the positive switching overlap explained with the aid of FIG. 2 so that a momentary connection of the connection B both to T and to P is avoided.

I claim:

1. Seat valve comprising a housing defining a bore, a spherical valve element having a diameter smaller than the diameter of said bore and moveable therein, a pair of valve seats spaced along said bore and engagable by said valve element for controlling the flow through said valve seats, a first connection extending through and intersecting said bore and being selectively connectable to selected second and third connections remote from said bore through respective of said valve seats, a sleeve holding said valve element and having a diameter complementary to said bore, and at least one defining sleeve control edge cooperable with said first connection to control the flow therethrough, wherein said valve seats, said first connection, and the length of said sleeve are spaced such that when said spherical valve element opens a respective valve seat simultaneous communication between said first connection and said second and third connections is prevented by movement of said sleeve control edge.

2. Seat valve according to claim 1, characterized in that the sleeve is displaceable guided in the bore and the valve element is held in the sleeve with clearance to permit an alignment of the valve element with the valve seat.

3. Seat valve according to claim 2 characterized in that the valve element is arranged sealingly in the sleeve for precluding flow therethrough.

4. Seat valve according to claim 1 characterized in that the valve element is a ball held in the sleeve.

5. Seat valve according to claim 4, characterized in that an end face of the sleeve is widened and the ball is held at the step thereby formed.

6. Seat valve according to claim 5, characterized in that the ball is held at the step by a ring.

7. Seat valve according to claim 1 characterized in that the valve element is displaceable by an actuating piston.

8. Seat valve according to claim 7 characterized in that the valve element is displaceable by an actuating piston in one direction and by pressure action in the other direction.

9. Seat valve according to claim 8 characterized in that an end face of the sleeve subjected to pressure is formed as onflow face.

* * * * *